United States Patent [19]

Koyama et al.

[11] Patent Number: 4,752,641

[45] Date of Patent: Jun. 21, 1988

[54] THERMOSETTING RESIN COMPOSITION AND PREPOLYMER OBTAINED THEREFROM

[75] Inventors: Toru Koyama; Hiroko Ohayashi, both of Hitachi; Junichi Katagiri, Ibaraki; Motoyo Wajima; Junji Mukai, both of Hitachi, all of Japan

[73] Assignee: Hitachi, Ltd., Tokyo, Japan

[21] Appl. No.: 42,514

[22] Filed: Apr. 24, 1987

Related U.S. Application Data

[63] Continuation of Ser. No. 902,882, Sep. 2, 1986, abandoned, which is a continuation of Ser. No. 706,950, Feb. 28, 1985, abandoned.

[30] Foreign Application Priority Data

Mar. 2, 1984 [JP] Japan .................................. 59-38596

[51] Int. Cl.$^4$ .............................................. C08F 22/40
[52] U.S. Cl. ...................................... 526/261; 526/262
[58] Field of Search ............................. 526/261, 262

[56] References Cited

U.S. PATENT DOCUMENTS 4,463,147 7/1984 Diethelm ............................ 526/262

*Primary Examiner*—Paul R. Michl
*Attorney, Agent, or Firm*—Antonelli, Terry & Wands

[57] ABSTRACT

A thermosetting resin composition comprising (a) a polyfunctional maleimide, (b) at least one member selected from the group consisting of alkenylphenols and alkenylphenol ethers, and (c) an allyl ester of polyvalent carboxylic acid, or cyanuric or isocyanuric acid and a prepolymer obtained by preliminarily heating the thermosetting resin composition can be used as a solventless type varnish for impregnating, e.g. electric windings, or for preparing a prepreg, and can give a cured product with heating at 120°–250° C. having excellent heat resistance of class C (180° C. or higher) and electrical insulating properties.

15 Claims, 1 Drawing Sheet

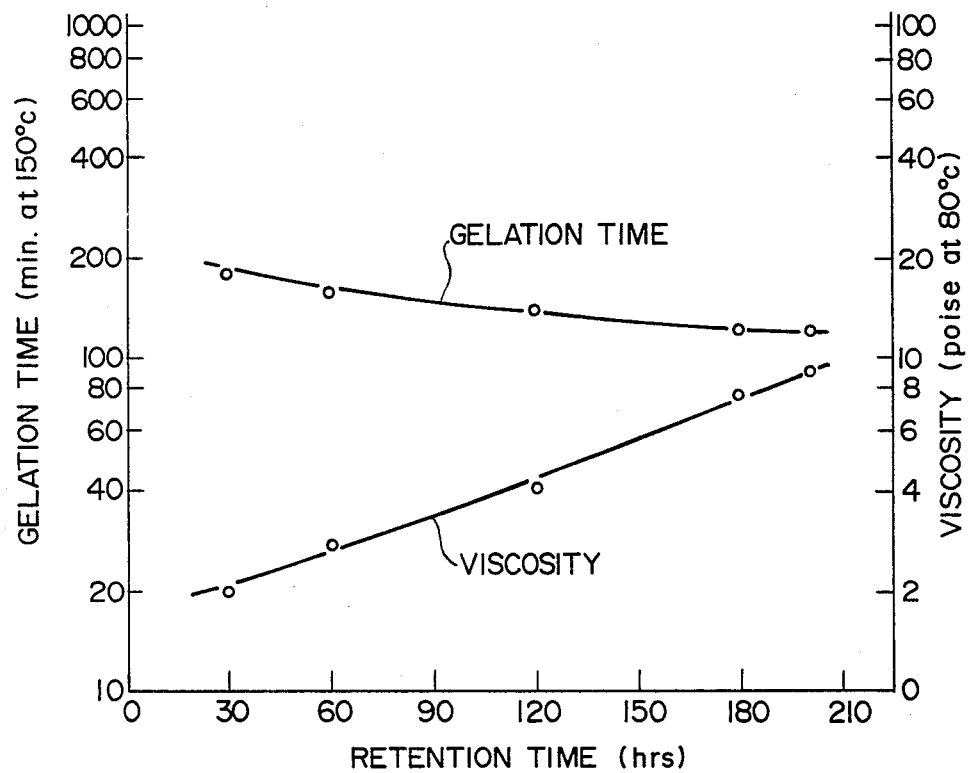

THERMOSETTING RESIN COMPOSITION AND PREPOLYMER OBTAINED THEREFROM

This application is a continuation of application Ser. No. 902,882, filed Sept. 2, 1986, abandoned, which is a continuation of application Ser. No. 706,950, filed Feb. 28, 1985, abandoned.

BACKGROUND OF THE INVENTION

This invention relates to a thermosetting resin composition having heat resistance of class C (180° C. or higher) and a prepolymer obtained therefrom. Particularly, this invention relates to a thermosetting resin composition suitable as a solventless varnish for impregnation, casting, laminating, molding and adhesion, and a prepolymer obtained therefrom.

With an increasing recent demand for miniaturization and weight-saving of electric machines and devices and their use under severe conditions, improvement of insulating materials in heat resistance has been demanded more and more. For example, varnishes for impregnating coils or casting are required to have a low viscosity with good workability (10 poises or lower at the time of impregnation), to show no voids after cured, and to give products having high mechanical strength at high temperatures. Heretofore, heat resistant insulating materials have been studied in the field of solvent type varnishes usable for enameled wire and laminating materials to develop excellent materials such as polyamide-imides, silicones, polydiphenyl ethers, and the like. Since these materials are usually solid, the use of solvents is necessary when used as varnishes. But the solvent type varnishes have many disadvantages in that they are poor in heat dissipation, low in dielectric strength and adhesive strength, poor in moisture resistance and large in deterioration by heating compared with solventless type varnishes, since the solvent vaporizes to easily produce a large number of voids at the time of curing of the solvent type varnishes. Therefore, it becomes very important for insulating electric machines and devices to use varnishes which are a solventless type containing no solvent and an addition polymerization type (non-polycondensation type) producing no volatile material with a progress of curing reaction.

At present, epoxy resins which have a low viscosity and good workability are used widely as a solventless type varnish relatively excellent in heat resistance. But the upper limit of usable temperature of the epoxy resins is 180° C. even if combined in various ways. Solventless type silicone varnishes have been noticed due to their thermal stability, but their use is limited due to poor mechanical strength at high temperatures and no good solvent resistance.

On the other hand, bismaleimide polymers obtained by reacting an amine with maleic anhydride are not only excellent in heat resistance due to imide groups, but also an addition polymerization product which does not produce volatile components. Therefore, they are noticed recently. But the bismaleimide polymers obtained by radical polymerization are large in thermal shrinkage at the time of curing due to higher cross-linking density. Further, the resin obtained by curing reaction is mechanically brittle and not suitable for practical use. In order to improve such disadvantages, it is proposed to conduct addition polymerization of bismaleimide with a diamine, and the like (U.S. Pat. No. 3,658,764=British Patent No. 1,190,718). The resulting polymer is excellent in physical and chemical heat resistance and electrical properties but cannot be used as a solventless type varnish due to a very high melting point or glass transition point of its resin composition (the viscosity of varnish for coil impregnation being 10 poises or less).

In order to make casting possible without using a solvent, it is proposed to lower the melting point to near room temperature by mixing monomaleimide, bismaleimide, and the like (British Patent No. 1,277,790). But even this process is insufficient in lowering the viscosity and further lowers the heat resistance.

It is also proposed to lower the viscosity by adding an liquid epoxy (Japanese Patent Appln Kokoku (Post-Exam. Publn.) Nos. 20080/74, 1960/74, 9840/75, and 29760/76; and U.S. Pat. No. 3,875,113=British Patent No. 1,412,224). But according to these processes, since precipitates are easily produced at near room temperature, the resulting polymers can hardly be used as solventless type varnishes. Further, there is another disadvantage in that the heat resistance of cured products is largely lowered compared with the case of adding no epoxy.

It is further proposed to mix with a polyvalent carboxylic acid allyl ester such as diallyl phthalate, triallyl trimellitate or triallyl isocyanurate (Japanese Patent Appln Kokoku (Post-Exam. Publn.) No. 13676/78). But according this process, since a principitate is easily produced at near room temperature, the resulting polymer is hardly used as a solventless type varnish. Further, there is another disadvantage in that the cured product is brittle and easily cracked, and low in heat resistance.

Recently, it is also proposed to combine with diallyl bisphenol A, or the like (U.S. Pat. No. 4,100,140=British Patent No. 1,538,470). The resin composition disclosed therein is good in storage stability and is cured with heating. But such a combination makes the melting point or viscosity high, so that the resulting composition cannot be used at room temperature as a resin for casting or a resin for coil impregnation. When heated so as to lower the viscosity (the viscosity of 10 poises or less being necessary for the impregnation), there arises another problem in that the curing reaction proceeds so as to shorten the usable time. Further, the cured product is low in heat resistance.

SUMMARY OF THE INVENTION

It is an object of this invention to provide a thermosetting resin composition excellent in heat resistance and suitable as electrical insulating material for impregnation, casting, adhesion, and the like. It is another object of this invention to provide a prepolymer obtained from said thermosetting resin composition excellent in heat resistance and suitable as electrical insulating material for impregnation, casting, laminating, molding, adhesion, and the like.

This invention provides a thermosetting resin composition comprising
(a) a polyfunctional maleimide,
(b) at least one member selected from the group consisting of alkenylphenols and alkenylphenol ethers, and
(c) an allyl ester of polyvalent carboxylic acid or cyanuric or isocyanuric acid.

This invention also provides a prepolymer obtained by heating a thermosetting resin composition comprising (a) a polyfunctional maleimide,
(b) at least one member selected from the group consisting of alkenylphenols and alkenylphenol ethers, and
(c) an allyl ester of polyvalent carboxylic acid or cyanuric or isocyanuric acid.

BRIEF DESCRIPTION OF THE DRAWING

The attached drawing is a graph showing a gelation time and viscosity change of one example of the thermosetting resin composition of this invention.

DETAILED DESCRIPTION OF THE PREFERRED EMBODIMENTS

The thermosetting resin composition and prepolymer of this invention is low in viscosity, long in pot life and is cured with heating to give a cured product excellent in heat resistance (180° C. or higher).

The prepolymer of this invention is obtained by oligomerization of the thermosetting resin composition of this invention with heating. This prepolymer can be used as a solventless type varnish for impregnating, e.g. electric winding or prepregs. For example, a prepreg can be obtained by impregnating a composite insulating material such as glass-backed mica tape with the thermosetting resin composition of this invention and heating to B-stage.

The polyfunctional maleimide used as the component (a) in the thermosetting resin composition is a maleimide having in its molecule at least two groups represented by the formula:

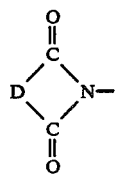

wherein D is a divalent group having a carbon-carbon double bond.

Examples of the polyfunctional maleimide are bifunctional maleimides such as N,N'-ethylene bismaleimide, N,N'-hexamethylene bismaleimide, N,N'-dodecamethylene bismaleimide, N,N'-m-xylylene bismaleimide, N,N'-p-xylene bismaleimide, N,N'-1,3-bismethylenecyclohexane bismaleimide, N,N'-1,4-bismethylenecyclohexane bismaleimide, N,N'-2,4-tolylene bismaleimide, N,N'-2,6-tolylene bismaleimide, N,N'-3,3'-diphenylmethane bismaleimide, N,N'-4,4'-diphenylmethane bismaleimide, N,N'-3,3'-diphenylsulfone bismaleimide, N,N'-4,4'-diphenylsulfone bismaleimide, N,N'-4,4'-diphenylsulfide bismaleimide, N,N'-p-benzophenone bismaleimide, N,N'-4,4'-diphenyl ether bismaleimide, N,N'-(methyleneditetrahydrophenyl) bismaleimide, N,N'-(3-ethyl)-4,4'-diphenylmethane bismaleimide, N,N'-(3,3'-dimethyl)-4,4'-diphenylmethane bismaleimide, N,N'-(3,3'-diethyl)-diphenylmethane bismaleimide, N,N'-(3,3'-dichloro)-4,4'-diphenylmethane bismaleimide, N,N'-tolidine bismaleimide, N,N'-isophorone bismaleimide, N,N'-p,p-diphenyldimethylsilyl bismaleimide, N,N'-benzophenone bismaleimide, N,N'-4,4'-2,2'-diphenylpropane bismaleimide, N,N'-naphthalene bismaleimide, N,N'-p-phenylene bismaleimide, N,N'-m-phenylene bismaleimide, N,N'-4,4'-(1,1-diphenylcyclohexane)bismaleimide, N,N'-3,5-(1,2,4-triazole) bismaleimide, N,N'-pyridine-2,6-diyl bismaleimide, N,N'-5-methoxy-1,3-phenylene bismaleimide, 1,2-bis(2-maleimideethoxy)ethane, 1,3-bis(3-maleimidepropoxy)propane, N,N'-4,4'-diphenylmethane-bisdimethylmaleimide, N,N'-hexamethylene-bis-dimethylmaleimide, N,N'-4,4'-(diphenyl ether)-bis-dimethylmaleimide, N,N'-4,4'-diphenylsuflone-bis-dimethylmaleimide, N,N'-bismaleimide of 4,4'-diamino-triphenylphosphate, etc.; polyfunctional maleimides obtained by reacting 3,4,4'-triaminodiphenylmethane, triaminophenol, or the like with maleic anhydride; trifunctional maleimides obtained by reacting tris-(4-aminophenyl) phosphate or tris(4-aminophenyl) thiophosphate with maleic anhydride; etc. These polyfunctional maleimides can be used alone or as a mixture thereof.

As the component (b), there is used at least one member selected from the group consisting of alkenylphenols and alkenylphenol ethers. The alkenylphenols can be obtained by heat treating alkenylphenol ethers which are isomers thereof at high temperatures such as 180° to 250° C. to bring about Claisen's rearrangement. The alkenylphenol ethers can be synthesized by a known process wherein a phenolic compound is reacted with an alkenyl halide in the presence of an alkali metal hydroxide and a solvent.

Examples of the phenolic compound are monovalent phenols such as phenol, cresol, xylenol, p-tert-butylphenol, etc.; polyvalent phenols such as 4,4'-dihydroxydiphenylpropane (bisphenol A), 4,4'-dihydroxydiphenylethane (bisphenol F), 4,4'-dihydroxydiphenyl sulfone (bisphenol S), 3,3'-dihydroxydiphenylpropane, 4,4'-dihydroxydiphenyl ether, 4,4'-dihydroxy-2,2'-dimethyldiphenyl ether, 4,4'-dihydroxydiphenyl sulfide, 4,4'-dihydroxydiphenyl ketone, hydroquinone, resorcinol, catechol, a phenol resin, a cresol resin, etc.

The alkenylphenols can also be produced by reacting o-allylphenol with an aldehyde or ketone. It is also possible to use natural products such as eugenol, isoeugenol, eugenol methyl ether, and their derivatives.

These alkenylphenols and alkenylphenol ethers can be used alone or as a mixture thereof.

The component (c) is an allyl ester of polyvalent carboxylic acid, preferably aromatic polyvalent carboxylic acid, or cyanuric or isocyanuric acid. Examples of the component (c) are triallyl trimellitate, diallyl terephthalate, diallyl isophthalate, p,p'-diallyloxycarbonyl diphenyl ether, m,p'-diallyloxycarbonyl diphenyl ether, o,p'-diallyloxycarbonyl diphenyl ether, m,m'-diallyloxycarbonyl diphenyl ether, triallyl cyanurate, triallyl isocyanurate, etc. These allyl esters of polyvalent carboxylic acids, or cyanuric or isocyanuric acid can be used alone or as a mixture thereof. Among them, the use of triallyl isocyanurate is more preferable from the viewpoint of heat resistance.

The component (b), i.e. the alkenylphenol and/or alkenylphenol ether, is used in an amount of preferably 0.1 to 10 equivalent weight, more preferably 0.2 to 1.0 equivalent weight per equivalent weight of the component (a), i.e. the polyfunctional maleimide. If the amount of the component (b) is too small, there is a tendency to make the cured product brittle, while if the amount of the component (b) is too much, the heat resistance is lowered. Particularly, when the amount of the component (b) is more than 1.0 equivalent weight, phenolic hydroxyl groups are retained to show a tendency to inhibit polymerization of allyl groups, which results in lowering the heat resistance.

The component (c), i.e., the allyl ester of polyvalent carboxylic acid, or cyanuric or isocyanuric acid is used in an amount of preferably 10 to 300 parts by weight, more preferably 20 to 100 parts by weight, per 100 parts by weight of the total of the components (a) and (b). If the amount of the component (c) is too small, there is a tendency to raise the viscosity, while if the amount is too large, the viscosity is lowered but there is a tendency to lower the heat resistance.

The resin composition of this invention can sufficiently be used without using a catalyst. In order to accelerate the reaction, the use of a free radical catalyst or ionic catalyst is effective. The catalyst can be used in an amount of preferably 0.1 to 10% by weight, more preferably 0.1 to 5% by weight based on the total weight of the reactants, i.e. the components (a), (b) and (c).

Examples of the free radical catalyst are conventionally used organic peroxides, hydroperoxides and azo compounds such as azobisisobutyronitrile, etc. Examples of the ionic catalyst are tertiary, secondary and primary amines, quaternary ammonium salts, alkali metal compounds, etc. These catalysts can be used as a mixture thereof.

Examples of the amine catalysts are triethylamine, tributylamine, triamylamine, diethylamine, benzylamine, tetramethyldiaminodiphenylmethane, N,N-diisobutylaminoacetonitrile; heterocyclic bases such as quinoline, N-methylpyrrolidine, imidazole, benzimidazole, and their homologues; mercaptobenzothiazole, benzyltrimethylammonium hydroxide, benzyltrimethylammonium methoxide, sodium methylate, etc.

The resin composition of this invention can be modified depending on the use of desired insulating materials. Examples of such a modification are a modification with an epoxy resin and other various curing agents; a modification with a vinyl monomer such as styrene, methyl methacrylate, or the like; a modification with a synthetic rubber such as polybutadiene, polychloroprene, etc.; a modification with an unsaturated polyester; a modification with a diallyl phthalate or triallyl phthalate prepolymer; a modification with an amine such as an aliphatic amine, an aromatic amine, allylamine, etc.; a modification with a furan compound or a phenol resin, and the like. It is also possible to add an inorganic filler to the resin composition of this invention.

The resin composition of this invention seems to be cured as follows, but not precisely identified:
(i) about 150° C. or lower:
 addition of phenolic hydroxyl groups to double bond of maleimide as shown in equation (1):

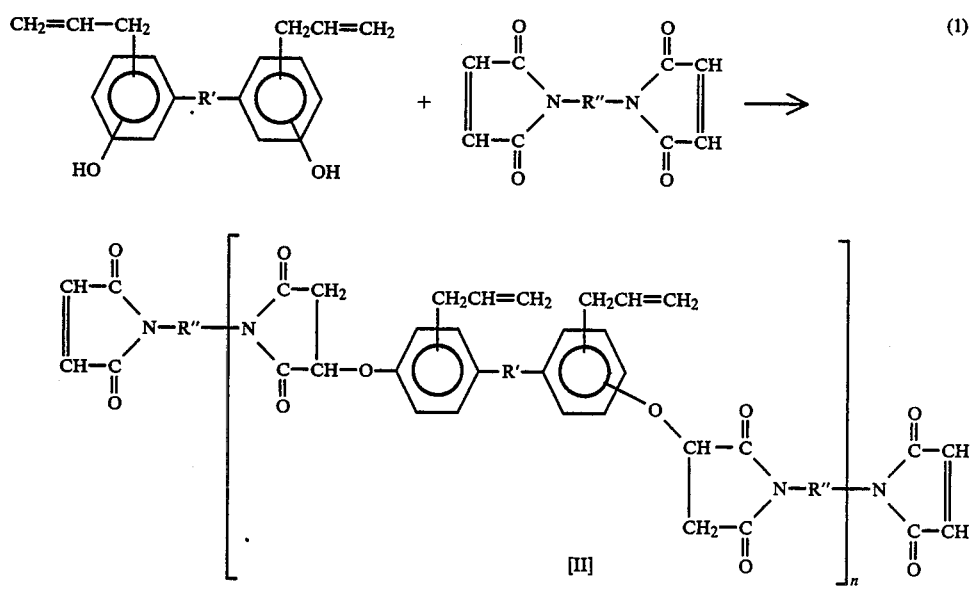

wherein
R' = residual group of allylphenol
R" = residual group of maleimide
n = positive integer
(ii) 150° C. or higher:
 radical polymerization of maleimide groups and allyl groups proceeds to cross-link three-dimensionally as shown in equation (2);

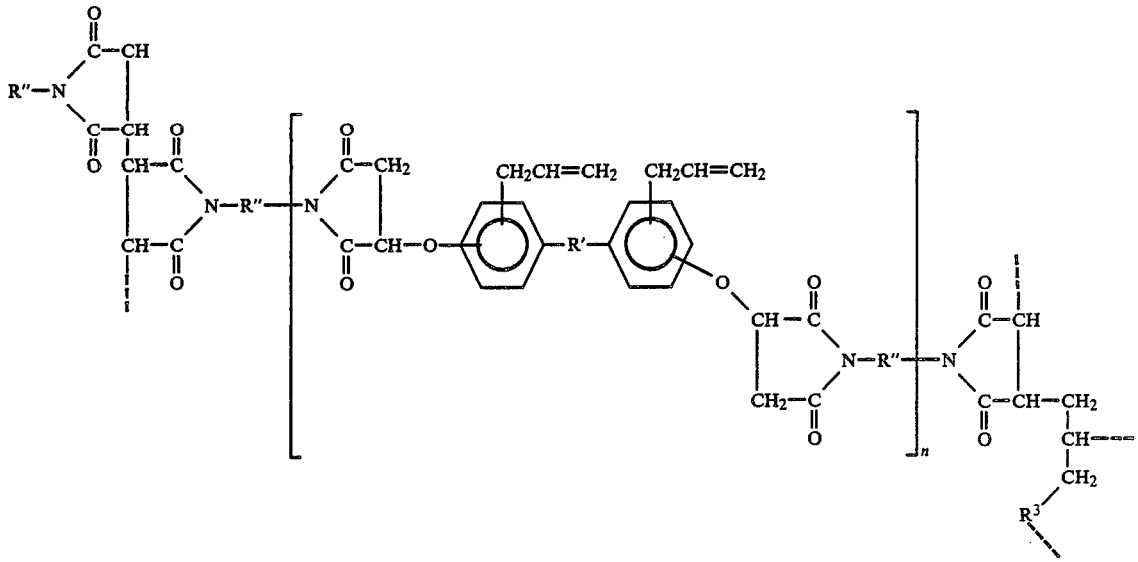

wherein
$R^3$ = residual group of allyl ester of polyvalent carboxylic acid or cyanuric or isocyanuric acid.

The prepolymer of this invention can be obtained by preliminarly heating the thermosetting resin composition of this invention so as not to deposit a precipitate immediately after melted with heating, for example, heating at 60° to 180° C., preferably 100° to 140° C., for 24 hours to 5 minutes. The structure of the prepolymer is not sure but seems to have mainly the formula [II] shown in the equation (1) and the polymerization of maleimide groups and allyl groups seems to take place partially, taking IR spectra and GPC data into consideration.

Since such a prepolymer does not deposit a precipitate, it is most suitable as a solventless type varnish or adhesive. Further a prepreg obtained by containing the prepolymer in an amount of 20 to 60% by weight is suitable as a binding agent for reinforced substrates and mica sheets or mica sheet formed by mixing with an aromatic polyamide to give electrical insulating materials and laminates.

This invention is illustrated by way of the following Examples, in which all parts and % are by weight unless otherwise specified.

EXAMPLE 1

Production of o,o'-diallyl bisphenol F

Bisphenol F (200 g), 82.5 g of NaOH and 1 liter of n-propanol were heated under reflux. After dissolving the whole ingredients, 200 ml of allyl chloride was added slowly. After 3 hours, the resulting mixture became substantially neutral. The stirring was continued for further additional 3 hours under reflux while boiling. After cooled to room temperature, the precipitated NaCl was filtered off and the n-propanol was removed by distillation. The thus obtained curde diallyl ether of bisphenol F (280 g) was dissolved in methylene chloride, and washed with water. After separating the aqueous layer, the methylene chloride was removed by distillation again. The resulting pure diallyl ether of bisphenol F was dried over sodium sulphate. Then, monoethyl ether of diethylene glycol was added to the diallyl ether of bisphenol F to control the concentration at 50% and the Claisen's rearrangement was carried out at 200°–250° C., followed by removal of monoethyl ether of diethylene glycol by distillation under reduced pressure to give o,o'-diallyl bisphenol F (hereinafter referred to as "DABF"). DABF has a viscosity of 12 poises (at 25° C.), a refractive index of 1.59 and a chlorine content of 50 ppm or less.

EXAMPLE 2

Production of o,o'-diallyl bisphenol A

The process of Example 1 was repeated except for using bisphenol A in place of bisphenol F to give o,o'-diallyl bisphenol A (hereinafter referred to as "DABA"). Crude DABA was distilled under reduced pressure to give a fraction having a boiling point of 190° C./0.5 mmHg.

EXAMPLES 3 TO 12, COMPARATIVE EXAMPLES 1 to 6 o,o'-Diallyl bisphenol F (DABF), 4,4'-diphenylmethane bismaleimide (BMI) and triallyl isocyanurate (TAIC) were mixed in proportions as shown in Table 1 and heated to 130° C. in an oil bath to dissolve completely. When allowed to stand for cooling, individual compositions except for Comparative Example 6 produced precipitates in the range of room temperature to 100° C. This revealed that these compositions were unsuitable for solventless type varnishes as they were.

Then, after dissolved completely, the solutions were kept at 130° C. for about 25 minutes to give prepolymers. These prepolymers did not precipitate even if cooled to room temperature. The viscosity of these prepolymers at 80° C. was measured by using a B type viscometer and listed in Table 1. The pot life of the prepolymers kept at 80° C. was also measured and listed in Table 1. The pot life was defined as the number of days reaching the viscosity 5 times as large as the initial value.

Then, each prepolymer was degassed under reduced pressure, poured into a mold and heated at 120° C. for 5 hours, 150° C. for 15 hours, 200° C. for 3 hours, 230° C. for 3 hours and 250° C. for 12 hours. After cooling, the mold was removed to give a reddish brown resin plate except for Comparative Example 6. In Comparative Example 6, no solid resin plate was obtained. When 5 g of dicumyl peroxide was added to the composition of Comparative Example 6 and heated at 120° C./5 hours+150° C./15 hours+200° C./3 hours+230° C./3 hours+250° C./12 hours, no solid resin was obtained.

The glass transition point (Tg) and the heat resistance of the resulting resin plates were measured and listed in Table 1. The heat resistance of each resin plate was measured by placing a resin plate of 15×25×2 mm in an air circulation type constant temperature bath maintained at 295° C., taking out the resin plate after a predetermined time and weighing, and defined as a time (days) necessary for reducing the weight 10% by weight with heating.

As is clear from Table 1, Examples 3 to 12 are excellent in the heat resistance to satisfy the class C heat resistance sufficiently, long in the pot life and low in the viscosity (10 poises or less at 80° C.) to make it possible to impregnate coils, compared with Comparative Examples 1 to 6.

TABLE 1

| | Example No. | | | | | | | |
|---|---|---|---|---|---|---|---|---|
| | Comparative Examples | | | | | | Example | |
| | 1 | 2 | 3 | 4 | 5 | 6 | 3 | 4 |
| Composition (g) | | | | | | | | |
| BMI | 40 | 55 | 70 | 80 | 100 | 0 | 70 | 70 |
| DABF | 60 | 45 | 30 | 20 | 0 | 100 | 30 | 30 |
| TAIC | 0 | 0 | 0 | 0 | 100 | 100 | 43 | 67 |
| Viscosity (poises at 80° C.) | 50 | 80 | >100 | >100 | Precipitated | <0.1 | 4 | 1 |
| Glass transition point (°C.) | 200 | >300 | >300 | >300 | >300 | —*1 | >300 | >300 |
| Heat resistance (days) | 15 | 17 | 17 | 15 | 2 | —*1 | 16 | 15 |
| Pot life (days) | 1 | 1 | 1 | 1 | 30 | —*1 | 8 | 9 |

| | Example No. | | | | | | | | | |
|---|---|---|---|---|---|---|---|---|---|---|
| | Example | | | | | | | | | |
| | 5 | 6 | 7 | 8 | 9 | 10 | 11-1 | 11-2 | 12-1 | 12-2 |
| Composition (g) | | | | | | | | | | |
| BMI | 70 | 70 | 80 | 80 | 55 | 55 | 55 | 55 | 40 | 40 |
| DABF | 30 | 30 | 20 | 20 | 45 | 45 | 45 | 45 | 60 | 60 |
| TAIC | 100 | 150 | 67 | 100 | 43 | 67 | 100 | 150 | 43 | 67 |
| Viscosity (poises at 80° C.) | 0.7 | 0.45 | 2.5 | 1 | 1.5 | 1 | 0.3 | 0.1 | 1 | 0.6 |
| Glass transition point (°C.) | >300 | >300 | >300 | 250 | 300 | 280 | 250 | 240 | 200 | 190 |
| Heat resistance (days) | 12 | 8.5 | 15 | 12 | 15 | 13 | 9 | 6 | 8 | 6 |
| Pot life (days) | 10 | 12 | 12 | 13 | 7 | 9 | 10 | 15 | 13 | 15 |

(Note)
*1not solidified.

EXAMPLE 13

Mechanical properties and electrical properties of the cured product obtained in Example 4 were measured at an initial time and after deteriorated with heating at 290° C. for 10 days. The results are shown in Table 2. As is clear from Table 2, the cured product shows excellent mechanical and electrical properties both at room temperature and as high as at 250° C.

TABLE 2

| | Initial properties | |
|---|---|---|
| | Mechanical properties | |
| Measured at room temperature | Flexural strength (kg/mm$^2$) | 9.8 |
| | Strain at break (%) | 2.5 |
| | Flexural modulus (kg/mm$^2$) | 3.9 × 10$^2$ |

TABLE 2-continued

| Measured at 250° C. | Flexural strength (kg/mm$^2$) | 6.3 |
|---|---|---|
| | Strain at break (%) | 3.4 |
| | Flexural modulus (kg/mm$^2$) | 2.3 × 10$^2$ |
| | Electrical properties | |
| Measured at room temperature | Dielectric loss tangent (%) | 0.2 |
| | Dielectric constant | 2.9 |
| | Volume resistivity (Ω · cm) | 5 × 10$^{16}$ |
| Measured at 250° C. | Dielectric loss tangent (%) | 1.0 |
| | Dielectric constant | 2.9 |
| | Volume resistivity (Ω · cm) | 5 × 10$^{13}$ |
| Properties after deteriorated at 290° C. for 10 days | | |
| | Mechanical properties | |
| Measured at room temperature | Flexural strength (kg/mm$^2$) | 8.6 |
| | Strain at break (%) | 3.1 |
| | Flexural modulus (kg/mm$^2$) | 4.2 × 10$^2$ |
| Measured at 250° C. | Flexural strength (kg/mm$^2$) | 5.3 |
| | Strain at break (%) | 3.5 |
| | Flexural modulus (kg/mm$^2$) | 3.2 × 10$^2$ |

EXAMPLES 14 TO 25

A mixture of 70 g of BMI, 30 g of DABF and 67 g of TAIC was heated to 130° C. in an oil bath to completely dissolve and kept at 130° C. for 25 minutes to give a prepolymer. The prepolymer was cooled to 80° C. and catalysts shown in Table 3 were added thereto in amounts as shown in Table 3. The viscosity at 80° C. was 1 poise in each case. Each prepolymer was casted in a mold and heated at 120° C./5 hours+150° C./15 hours+200° C./3 hours+230° C./3 hours to give a reddish brown transparent resin plate. The glass transition point (physical heat resistance) and the heat resistance (chemical) were measured and listed in Table 3. As is clear from Table 3, the compositions added with the catalysts show good heat resistance even cured at low temperatures.

TABLE 3

| | Example No. | | | | | | |
|---|---|---|---|---|---|---|---|
| | 4 | 14 | 15 | 16 | 17 | 18 | 19 |
| Composition (g) | | | | | | | |
| BMI | 70 | 70 | 70 | 70 | 70 | 70 | 70 |
| DABF | 30 | 30 | 30 | 30 | 30 | 30 | 30 |
| TAIC | 67 | 67 | 67 | 67 | 67 | 67 | 67 |
| Catalyst | 0 | 0 | 2-Phenylimidazole 1.67 | N,N'—Tetra methylamino- diphenylmethane 1.67 | Sodium methylate 1.67 | Triethylamine 1.67 | Benzoyl peroxide 1.67 |
| Voscosity (poises at 80° C.) | 1 | 1 | 1 | 1 | 1 | 1 | 1 |
| Glass transition point (°C.) | >300 | 250 | >300 | >300 | >300 | >300 | >300 |
| Heat resistance (days) | 15 | 15 | 15 | 15 | 15 | 15 | 15 |

| | Example No. | | | | | |
|---|---|---|---|---|---|---|
| | 20 | 21 | 22 | 23 | 24 | 25 |
| Composition (g) | | | | | | |
| BMI | 70 | 70 | 70 | 70 | 70 | 70 |
| DABF | 30 | 30 | 30 | 30 | 30 | 30 |
| TAIC | 67 | 67 | 67 | 67 | 67 | 67 |
| Catalyst | Dicumyl peroxide 1.67 | Cumene hydroperoxide 1.67 | Azobis- butyro- nitrile 1.67 | N,N—di allyl- melamine 1.67 | Benzylamine 1.67 | Benzyltri- methylammonium hydroxide 1.67 |
| Voscosity (poises at 80° C.) | 1 | 1 | 1 | 1 | 1 | 1 |
| Glass transition point (°C.) | >300 | >300 | >300 | >300 | >300 | >300 |
| Heat resistance (days) | 15 | 15 | 15 | 15 | 15 | 15 |

EXAMPLES 26 TO 28

Each mixture of BMI, diallylbisphenol and/or diallylbisphenol ether and TAIC in amounts as listed in Table 4 was subjected to the measurement of the viscosity, the glass transition point and the heat resistance in the same manner as in Example 4. The results are very good as shown in Table 4.

TABLE 4

| | Example No. | | |
|---|---|---|---|
| | 26 | 27 | 28 |
| Composition (g) | | | |
| BMI | 70 | 70 | 70 |
| Diallyl- bisphenol or diallyl- bisphenol ether | DABA 30 | Diallyl ether of bisphenol F 30 | DABF 25 / Diallyl ether of bisphenol F 5 |
| TAIC | 67 | 67 | 67 |
| Voscosity (poises at 80° C.) | 2 | 1 | 0.8 |
| Glass transition point (°C.) | >300 | >300 | >300 |
| Heat resistance (days) | 9 | 9 | 9 |

EXAMPLE 29

A mixture of 49 g of BMI, 21 g of DABF and 30 g of TAIC was heated at 120° C. and relations between a retention time and a gelation time, and between a retention time and a viscosity were shown in the attached drawing.

As is clear from the drawing, a prepolymer after retained at 120° C. for 200 minutes has a viscosity of 9 poises and does not produce a precipitate even if cooled to room temperature. This prepolymer showed a decrease in the absorption at 3500 cm$^{-1}$ due to the phenolic OH group in infrared absorption spectrum but showed a new absorption at 1150 cm$^{-1}$ due to a —CH$_2$—CH—O—C$_6$H$_4$— group.

Further, according to gel permeation chromatography (GPC) of the prepolymer, BMI and DABF were addition reacted in equimolar amounts (about 40% of DABF) and at the same time about 20% of TAIC was reacted.

EXAMPLES 30 TO 39, COMPARATIVE EXAMPLE 7

Each mixture of BMI, DABF and TAIC or DAIP or TATME or TMPMA, and if required a polymerization catalyst or a storage stabilizer in amounts as listed in Table 5 was heated to 130° C. to dissolve completely to give a thermosetting resin composition having a viscosity of 2.5 poises at 80° C. This composition was heated at 150° C. for 15 hours and at 260° C. for 15 hours to give a reddish brown cured product.

On the other hand, a glass fiber-reinforced polyimide tape was wound around a conductor of electric coil 3 times with ½ pitch of the tape width and impregnated with the above-mentioned each resin composition at 80° C. under vacuum, followed by curing with heating at 150° C. for 15 hours and 260° C. for 15 hours.

Physical properties of the cured products and dielectric breakdown voltage of electric windings thus obtained were measured and listed in Table 5.

For comparison, a resin composition containing no allyl ester of polyvalent carboxylic acid or isocyanuric acid was prepared and treated in the same manner as mentioned above. Physical properties of the cured product and electric breakdown voltage of electric winding thus obtained were also measured and listed in Table 5.

TABLE 5

Example No.

TABLE 5-continued

|  |  | Example |  |  |  |  |  |  |
|---|---|---|---|---|---|---|---|---|
|  |  | 30 | 31 | 32 | 33 | 34 | 35 | 36 |
| Composition (parts) | BMI | 49 | 49 | 49 | 49 | 42 | 35 | 39 |
|  | DABF | 21 | 21 | 21 | 21 | 18 | 15 | 31 |
|  | Allyl ester of polyvalent carboxylic acid | TAIC 30 | TAIC 30 | TAIC 30 | TAIC 30 | TAIC 40 | TAIC 50 | TAIC 30 |
|  | Polymerization catalyst or storage stabilizer | BPO 1.0 | EMI 0.5 | Cyanoacetic acid 1.0 | — | — | — | BPO 1.0 |
| Properties of cured products | Glass transition point (°C.) | >300 | >300 | >300 | >300 | >300 | >300 | >300 |
|  | Heat resistance*¹ (°C.) | 230 | 225 | 220 | 235 | 235 | 225 | 235 |
|  | Flexural strength  Room temp. | 10.1 | 7.5 | 6.5 | 10.1 | 8.3 | 6.3 | 10.5 |
|  | 230° C. | 3.1 | 2.5 | 2.2 | 3.1 | 2.9 | 2.8 | 2.5 |
|  | Dissipation factor  Room temp. | 0.2 | 0.2 | 0.2 | 0.2 | 0.2 | 0.2 | 0.2 |
|  | 230° C. | 0.2 | 0.2 | 0.2 | 0.2 | 0.2 | 0.2 | 0.2 |
| Electric winding | Dielectric breakdown voltage (kV)  Initial | 35 | 38 | 38 | 35 | 35 | 34 | 36 |
|  | After heated at 230° C. for 20 days | 33 | 30 | 28 | 33 | 33 | 30 | 34 |

|  |  |  | Example No. |  |  | Comparative |
|---|---|---|---|---|---|---|
|  |  |  | Example |  |  |  |
|  |  |  | 37 | 38 | 39 | Example 7 |
| Composition (parts) | BMI |  | 49 | 49 | 49 | 49 |
|  | DABF |  | 21 | 21 | 21 | 21 |
|  | Allyl ester of polyvalent carboxylic acid |  | DAIP 30 | TATME 30 | TAIC 20 TMPMA 10 | — |
|  | Polymerization catalyst or storage stabilizer |  | BPO 1.0 | BPO 1.0 | — | — |
| Properties of cured products | Glass transition point (°C.) |  | >300 | >300 | >300 | >300 |
|  | Heat resistance*¹ (°C.) |  | 225 | 223 | 225 | 215 |
|  | Flexural strength  Room temp. |  | 7.5 | 7.4 | 7.5 | 14.7 |
|  | 230° C. |  | 2.8 | 2.8 | 2.7 | 3.1 |
|  | Dissipation factor  Room temp. |  | 0.2 | 0.2 | 0.2 | 0.2 |
|  | 230° C. |  | 0.2 | 0.2 | 0.2 | 0.6 |
| Electric winding | Dielectric breakdown voltage (kV)  Initial |  | 36 | 36 | 36 | Impossible to impregnate due to too high viscosity |
|  | After heated at 230° C. for 20 days |  | 32 | 29 | 33 |  |

Note to Table 5:
*¹Heat resistance was evaluated according to IEC standards No. 216 wherein a temperature necessary to reach 10% by weight reduction of the weight loss on heating for 20,000 hours was measured.
DAIP = diallyl isophthalate
TATME = triallyl trimellitate
TMPMA = trimethylpropane trimethacrylate
BPO = benzoyl peroxide
EMI = 2-ethyl-4-methylimidazole

EXAMPLES 40 TO 47

When the thermosetting resin composition of Example 30 was allowed to stand for cooling, there was produced a precipitate: this means that the resin composition is very difficult to use as a solventless type varnish. Thus, the thermosetting resin compsoition was maintained at 130° C. for about 25 minutes to give a prepolymer A. The prepolymer A did not produce a precipitate even if cooled to room temperature. The prepolymer A had a viscosity of 4 poises at 80° C. The prepolymer A was cured by heating at 150° C. for 15 hours and at 260° C. for 15 hours to give a reddish brown cured product. The cured product showed the same properties as those obtained in Example 30.

Properties of electric winding obtained in the same manner as described in Example 30 except for using the prepolymer A and insulating base materials as listed in Table 6 are shown in Table 6.

TABLE 6

|  |  | Example No. Example |  |  |  |  |  |  |  |  |
|---|---|---|---|---|---|---|---|---|---|---|
|  |  | 30 | 40 | 41 | 42 | 43 | 44 | 45 | 46 | 47 |
| Vanish composition (parts) | BMI | 49 | 49 | Heated at 130° C. for 25 minutes to give Prepolymer A. |  |  |  |  |  |  |
|  | DABF | 21 | 21 |  |  |  |  |  |  |  |
|  | TAIC | 30 | 30 |  |  |  |  |  |  |  |
|  | BPO | 1 | 1 |  |  |  |  |  |  |  |
| Insulating base material |  | Glass fiber-reinforced polyimide tape | Glass fiber-reinforced polyimide tape | Polyimide, glass fiber tape alternate winding | Glass fiber-reinforced mica tape | Glass fiber-reinforced fibrid mica tape | Polyimide tape | Polyaramide-reinforced mica tape | Polyimide-reinforced fibrid mica tape | Polyaramide-reinforced fibrid mica tape |
| Dielectric breakdown voltage | Initial | 35 | 35 | 35 | 38 | 38 | 32 | 38 | 39 | 38 |
|  | Heated at 250° C. for | 33 | 33 | 32 | 33 | 31 | 29 | 28 | 33 | 29 |

TABLE 6-continued

| | | Example No. Example | | | | | | | |
|---|---|---|---|---|---|---|---|---|---|
| | | 30 | 40 | 41 | 42 | 43 | 44 | 45 | 46 | 47 |
| (kV) | 20 days | | | | | | | | | |

EXAMPLE 48

A heat resistant mica paper having a two-layer structure obtained by fusing an aromatic polyaramide paper with a 2% polymer fibrid reconstituted mica was coated with the thermosetting resin composition (A) used in Example 30. The coating amount of the resin composition was adjusted to 40% in terms of the resin content of prepreg sheet. The resin coated mica tape was dried at 120° C. for 5 hours to give a prepreg sheet.

Four plies of the resulting prepreg sheet with 25 mm×25 mm in size were laminated and heat pressed at a temperature of 200° C. under a pressure of 10 kg/cm² for 30 minutes, followed by post cure at 260° C. for 5 hours. Using the thus obtained cured prepreg sheet, adhesive strength was measured and listed in Table 7. The adhesive strength was measured at room temperature by using the sample not treated (initial value) and the sample after subjected to thermal deterioration with heating at 250° C. for 20 days. Further, the prepreg sheet in the form of tape was wound around an electric conductor 3 times with ½ pitch of the tape width and heat pressed at 200° C. under a pressure of 10 kg/cm² for 30 minutes, followed by post cure at 260° C. for 5 hours under an atmospheric pressure. Dielectric breakdown voltage was measured as to the resulting electric winding at initial time and after deteriorated with heating at 250° C. for 20 days, and listed in Table 7.

EXAMPLE 49

The thermosetting resin composition (A) used in Example 30 was coated on polyethylene coated paper in an amount of 40% in terms of the resin content of prepreg sheet. On the resin coated surface, glass cloth, reconstituted mica sheet and polyethylene film were laminated in this order and the resulting laminated sheet was wound with a slight pressure. Then, the wound sheet was allowed to stand in a constant temperature bath kept at 110° C. for 10 hours to give a prepreg sheet wherein the thermosetting resin composition (A) had been penetrated uniformly into the glass cloth and the reconstituted mica sheet. The adhesive strength of the prepreg sheet and dielectric breakdown voltage of the electric coil were measured in the same manner as described in Example 48 and listed in Table 7.

TABLE 7

| | Example No. | 48 | 49 |
|---|---|---|---|
| Adhesive strength (kg/cm²) | Initial | 178 | 179 |
| | After heated at 250° C. for 20 days | 152 | 153 |
| Dielectric breakdown voltage (kV/mm) | Initial | 39 | 38 |
| | After heated at 250° C. for 20 days | 35 | 35 |

EXAMPLE 50

A prepreg was obtained by impregnating a glass cloth with the prepolymer used in Example 31 and heated in a constant temperature bath at 140° C. for 30 minutes. Then, 8 plies of the prepreg were laminated and electrodeposited copper foils were placed on both sides of the laminate, followed by laminating press at 180° C. under a pressure of 40 kg/cm² for 1 hour. Then, the laminate was subjected to a curing treatment at 260° C. for 2 hours to give a two-sided copper clad laminated board (MCL board) The MCL board was subjected to electrical properties test and heat resistance test according to JIS C 6481. The dielectric constant was 3.67 (1 MHz, at 25° C.), the dielectric loss tangent was 0.3% (1 MHz at 25° C.) and the solder heat resistance was no abnormality dipped at 300° C. for 120 seconds.

EXAMPLE 51, COMPARATIVE EXAMPLE 8

DABA was prepared in the same manner as described in Example 2. Crude DABA was distilled under reduced pressure to give a fraction having a boiling point of 190° C./0.5 mmHg.

Then, the process of Example 30 was repeated except for using DABA in place of DABF to give a cured product and an electric coil. In Comparative Example 8, no TAIC was used. Properties of the cured products and the electric coils were measured and listed in Table 8.

TABLE 8

| | Example No. | | Example 51 | Comparative Example 8 |
|---|---|---|---|---|
| Properties of cured product | Glass transition point (°C.) | | >300 | >300 |
| | Heat resistance (°C.) | | 238 | 215 |
| | Flexural strength (kg/mm²) | Room temp. | 10.8 | 14.3 |
| | | 230° C. | 3.2 | 3.2 |
| | Dielectric loss tangent (%) | Room temp. | 0.2 | 0.2 |
| | | 230° C. | 0.2 | 0.2 |
| Electric coil | Dielectric breakdown voltage (kV) | | 36 | Impossible to impregnate due to high viscosity |

What is claimed is:

1. A thermosetting resin composition comprising the following components:
    (a) an equivalent weight of a polyfunctional maleimide,
    (b) 0.2 to 1.0 equivalent weight of at least one member selected from the group consisting of an alkenylphenol and an alkenylphenol ether, and
    (c) 20 to 100 parts by weight of at least one member selected from the group consisting of allyl esters of polyvalent carboxylic acid or cyanuric or acid or isocyanuric acid per 100 parts by weight of the total of components (a) and (b).

2. A composition according to claim 1, wherein the component (a) is a maleimide having in its molecule at least two groups represented by the formula:

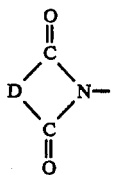

wherein D is a divalent group having a carbon-carbon double bond.

3. A composition according to claim 1, wherein the component (b) is diallyl bisphenol F or diallyl bisphenol A.

4. A composition according to claim 1, wherein the component (c) is triallyl isocyanurate.

5. A composition according to claim 1, which further comprises a free radical catalyst or an ionic catalyst in an amount of 0.1 to 5% by weight based on the total weight of the components (a), (b) and (c).

6. A composition according to claim 1, wherein the component (a) is a maleimide having in its molecule at least two groups represented by the formula:

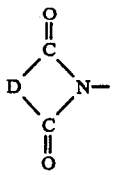

wherein D is a divalent group having a carbon-carbon double bond in an amount of 1 equivalent weight, the component (b) is diallyl bisphenol F or diallyl bisphenol A in an amount of 0.2 to 1.0 equivalent weight, and the component (c) is triallyl isocyanurate in an amount of 20 to 100 parts by weight per 100 parts by weight of the total weight of the components (a) and (b).

7. A prepolymer obtained by preliminarily heating a thermosetting resin composition comprising the following components:

(a) an equivalent weight of a polyfunctional maleimide, (b) 0.2 to 1.0 equivalent weight of at least one member selected from the group consisting of an alkenylphenol and alkenylphenol ether, and (c) 20 to 100 parts by weight of at least one member selected from the group consisting of allyl of polyvalent carboxylic acid or cyanuric acid or isocyanuric acid per 100 parts by weight of the total components (a) and (b).

8. A prepolymer according to claim 7, wherein the component (a) is a maleimide having in its molecule at least two groups represented by the formula:

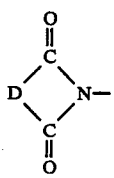

wherein D is a divalent group having a carbon-carbon double bond.

9. A prepolymer according to claim 7, wherein the component (b) is diallyl bisphenol F or diallyl bisphenol A.

10. A prepolymer according to claim 7, wherein the component (c) is triallyl isocyanurate.

11. A prepolymer according to claim 7, which further comprises a free radical catalyst or an ionic catalyst in an amount of 0.1 to 5% by weight based on the total weight of the components (a), (b) and (c).

12. A prepolymer according to claim 7, wherein the component (a) is a maleimide having in its molecule at least two groups represented by the formula:

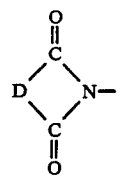

wherein D is a divalent group having a carbon-carbon double bond in an amount of 1 equivalent weight, the component (b) is diallyl bisphenol F or diallyl bisphenol A in an amount of 0.2 to 1.0 equivalent weight, and the component (c) is triallyl isocyanurate in an amount of 20 to 100 parts by weight of the total weight of the components (a) and (b).

13. A prepolymer obtained by heating a thermosetting resin composition comprising:

(a) an equivalent weight oif a polyfunctional maleimide, (b) 0.2 to 1.0 equivalent weight of an alkenylphenol, and (c) 20 to 100 parts by weight of at least one member selected from the group consisting of allyl esters of polyvalent carboxylic acid, cyanuric acid or isocyanuric acid per 100 parts by weight of the components (a) and (b); said prepolymer having a viscosity of 10 poises or less at 80° C.

14. A process for curing a prepolymer which comprises heating the prepolymer at 150° C. or higher, said prepolymer being obtained from a thermosetting resin composition comprising (a) an equivalent weight of a polyfunctional maleimide, (b) 0.2 to 1.0 equivalent weight of an alkenylphenol, and (c) 20 to 100 parts by weight of at least one member selected from the group consisting of allyl esters of polyvalent carboxylic acid, cyanuric acid or isocyanuric acid per 100 parts by weight of the total of the components (a) and (b); said prepolymer having a viscosity of 10 poises or less at 80° C.

15. A prepreg obtained by containing a prepolymer in an amount of 20 to 60% by weight in a reinforced substrate said prepolymer being obtained from a thermosetting resin composition comprising:

(a) an equivalent weight of a polyfunctional maleimide, (b) 0.2 to 1.0 equivalent weight of an alkenylphenol, and (c) 20 to 100 parts by weight of at least one member selected from the group consisting of allyl esters of polyvalent carboxylic acid, cyanuric acid or isocyanuric acid per 100 parts by weight of the total of the components (a) and (b); said prepolymer having a viscosity of 10 poises or less at 80° C.

* * * * *